United States Patent [19]

Nakamura

[11] Patent Number: 4,905,277
[45] Date of Patent: Feb. 27, 1990

[54] METHOD FOR ENCIPHERING AND DECIPHERING INSTRUCTIONS IN A MICROCOMPUTER, AND A MICROCOMPUTER USED FOR EFFECTING SAME

[75] Inventor: Haruhiko Nakamura, Yokohama, Japan

[73] Assignee: Fujitsu Limited, Kawasaki, Japan

[21] Appl. No.: 338,454

[22] Filed: Apr. 17, 1989

Related U.S. Application Data

[63] Continuation of Ser. No. 91,346, Aug. 28, 1987, abandoned, which is a continuation of Ser. No. 453,111, Dec. 27, 1982, abandoned.

[30] Foreign Application Priority Data

Dec. 29, 1981 [JP] Japan ................................. 56-213711

[51] Int. Cl.⁴ ............................................ H04K 1/00
[52] U.S. Cl. .......................................... 380/4; 380/25; 380/47; 380/49
[58] Field of Search ..................... 380/4, 25, 47, 49; 364/200, 900

[56] References Cited

U.S. PATENT DOCUMENTS

| | | | |
|---|---|---|---|
| 2,559,905 | 7/1951 | Turner, Jr. ................ | 178/22.08 |
| 3,631,405 | 12/1971 | Hoff et al. .................... | 364/200 |
| 3,764,988 | 10/1973 | Onishi ......................... | 364/200 |
| 3,798,605 | 3/1974 | Feistel ......................... | 178/22.08 |
| 3,846,763 | 11/1974 | Riikonen ...................... | 364/200 |
| 3,928,857 | 12/1975 | Carter et al. ................. | 364/200 |
| 4,120,030 | 10/1978 | Johnstone .................... | 364/200 |
| 4,168,396 | 9/1979 | Best ............................. | 178/22.09 |
| 4,246,638 | 1/1981 | Thomas ....................... | 364/200 |
| 4,306,289 | 12/1981 | Lumley ........................ | 364/200 |
| 4,433,207 | 2/1984 | Best ............................. | 178/22.09 |
| 4,437,149 | 3/1984 | Pomerene et al. ........... | 364/200 |
| 4,439,830 | 3/1984 | Chueh ......................... | 364/200 |
| 4,488,224 | 12/1984 | Ippolito et al. .............. | 364/200 |
| 4,513,174 | 4/1985 | Herman ....................... | 178/22.08 |
| 4,558,176 | 12/1985 | Arnold et al. ............... | 364/900 |
| 4,633,388 | 12/1986 | Chiu ............................ | 364/200 |
| 4,642,424 | 2/1987 | McNair ........................ | 380/49 |
| 4,674,063 | 7/1987 | Sato ............................. | 364/900 |
| 4,677,670 | 6/1987 | Henderson, Jr. ............. | 380/25 |

*Primary Examiner*—Salvatore Cangialosi
*Attorney, Agent, or Firm*—Staas & Halsey

[57] ABSTRACT

A method for enciphering and deciphering instructions in a microcomputer and a microcomputer for effecting the same, in which, an instruction is coded into at least two types of instruction codes and stored in a storage unit and in which, under the control of discriminating circuit for discriminating the coded format, each instruction code is decoded by one of at least two decoders in accordance with one of at least two decoding formats, so that the stored software is prevented from being learned by third persons.

21 Claims, 4 Drawing Sheets

Fig. 1

Fig. 2A    Fig. 2B (PROGRAM)

- - - - - - - LDA $0
- - - - - - LOOP ICA
- - - - - - - CMA $5
- - - - - - - JPZ LOOP

Fig. 3

PRIOR ART

| AD | ROM | DECODER | DECODED INSTRUCTION |
|----|------|---------|---------------------|
| 0  | 90   | ID₁     | LDA $0              |
| 1  | 71   | ID₁     | LOOP  ICA           |
| 2  | 3B 05| ID₁     | CMA $5              |
| 3  | 6F   | ID₁     | JPZ LOOP            |

Fig. 4

| AD | ROM | LSB | DECODER | DECODED INSTRUCTION |
|----|------|-----|---------|---------------------|
| 0  | 90   | 0   | $ID_1$  | LDA $0              |
| 1  | 25   | 1   | $ID_2$  | LOOP ICA            |
| 2  | 3B 05| 0   | $ID_1$  | CMA $5              |
| 3  | 40   | 1   | $ID_2$  | JPZ LOOP            |

Fig. 5

| AD | ROM  | DECODER | DECODED INSTRUCTION |
|----|------|---------|---------------------|
| 0  | 90   | $ID_1$  | LDA $0              |
| 1  | 25   | $ID_1$  | LDB $0              |
| 2  | 3B 05| $ID_1$  | CMA $5              |
| 3  | 40   | $ID_1$  | STA                 |

4,905,277

METHOD FOR ENCIPHERING AND DECIPHERING INSTRUCTIONS IN A MICROCOMPUTER, AND A MICROCOMPUTER USED FOR EFFECTING SAME

This is a continuation of application Ser. No. 091,346 filed on Aug. 28, 1987, now abandoned, which is a continuation of Ser. No. 453,111 filed on Dec. 27, 1982, now abandoned.

BACKGROUND OF THE INVENTION

1. Field of the Invention

The present invention relates to a method for enciphering and deciphering instructions in a microcomputer, so that third persons cannot learn the software, and a microcomputer used for effecting the same.

2. Description of the Prior Art

Software is essential rfor the opreation of most data processing systems. It takes considerable time and effort to produce software, however, so software must be protected. If third persons can easily learn the software, the time and effort expended in its development would in effect have been wasted. Accordingly, means for preventing the software from being known or discovered by third persons have become necessary.

Conventionally, a single type of software, i.e., software coded in accordance with one predetermined coding format, is stored in a data processing system. The single type of software is read and decoded by a single decoder to obtain control signals for data processing. The control signals enable the data processing system to perform the desired processing. The relationship between the software and the decoded results, however, can be easily learned by third persons, because the decoding is effected in accordance with a predetermined decoding format which can be easily learned by third persons. This is especially true with microcomputers, where anyone can easily read out programs stored in its read only memory (ROM). Therefore, it is necessary to provide some countermeasure for protecting programs from being read by third persons.

SUMMARY OF THE INVENTION

The present invention is provided to solve the above-mentioned problem. It is, therefore, an object of the present invention to provide a method for enciphering and deciphering instructions in which the developed software cannot be easily learned or discovered by third persons.

To attain the above object, there is provided a method for enciphering and deciphering instructions in a microcomputer and a microcomputer for effecting the same, wherein an instruction is coded into at least two types of instruction codes and stored in a storage unit and wherein, under the control of a discriminating device for discriminating the coded format, each instruction code is decoded by one of at least two decoders in accordance with one of at least two decoding formats.

BRIEF DESCRIPTION OF THE DRAWINGS

The above object and advantage as well as other features of the present invention will be better understood from the following description with reference to the accompanying drawings, in which.

DESCRIPTION OF THE PREFERRED EMBODIMENTS

Figure 1:
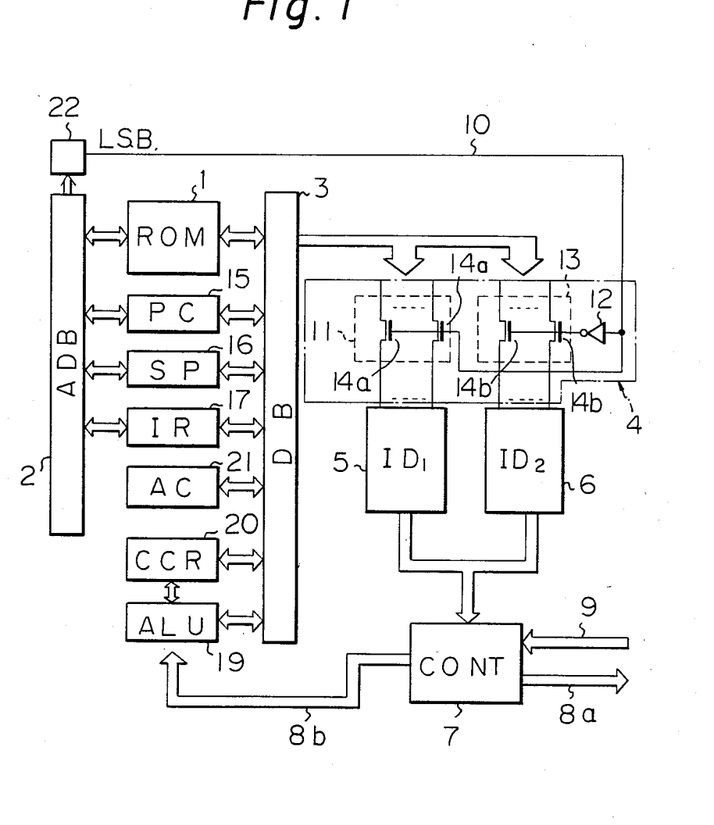
FIG. 1 is a block diagram illustrating a main portion of a microcomputer unit according to an embodiment of the present invention.

FIG. 1 is a block diagram illustrating a main portion of a microcomputer unit according to an embodiment of the present invention. In the figure, reference numeral 1 is a memory of, for example, a ROM into which software including a number of instruction codes is stored. ROM 1 may alternatively be provided outside of the microcomputer unit. ROM 1 is accessed by address signals generated from a program counter 15 and supplied through an address bus 2. Each instruction code read out from the ROM 1 by each of the address signals is output to a data bus 3. The data bus 3 is connected through a selecting circuit 4 to, in this embodiment, two instruction decoders 5 and 6. The outputs of the instruction decoders 5 and 6 are commonly connected to a control circuit 7. Based on the decoded instruction codes from the decoder 5 or 6, the control circuit 7 provides an output control signal to an external control signal bus 8a or an internal control signal bus 8b. The external control signal bus 8a is connected to external units to be controlled (not shown). The internal control signal bus 8b is connected to internal units such as an arithmetic and logic unit 19, a condition code register 20, and an accumulator 21. The control circuit 7 also receives via an input control signal bus 9 a reset signal, an interruption signal, clock signals, etc.

A discrimnating circuit 22 receives a predetermined bit signal from the address bus 2 and can merely buffer the bit signal as will be clear from the following description. The discriminating circuit 22 is connected through a selecting signal line 10 to the selecting circuit 4. The selecting circuit 4 includes a first gate circuit 11 comprising a number of field-effect transistors (FET) 14a having gate electrodes directly connected to the selecting signal line 10, an inverter circuit 12, and a second gate circuit 13 comprising a number of FET's 14b having gate electrodes connected through the inverter circuit 12 to the selecting signal line 10. The number of the FET's 14a or 14b is the same as the number of bits in the data bus 3. Thus, when the data bus 3 is an 8-bit bus, each gate circuit 11 or 13 consists of eight transistors. The discriminating circuit 22, in this embodiment, receives the least significant bit from the address signal.

Between the address bus 2 and the data bus 3, other than the program counter 15, the arithmetic and logic unit 19, the condition-code register 20, and the accumulator 20, there are provided, as is well known, a stack pointer 16 for temporarily storing a returning address from a subroutine to a main routine, and an index register 17 for storing refresh addresses and so forth. The accumulator 21 temporarily stores the results of arithmetic operations. The code condition register 20 and the arithmetic and logic unit 19 are connected with each other so that the condition-code register 20 supervises the state of the accumulator 21.

The operation of the microcomputer unit of FIG. 1 will now be described. Before a decoding operation, in this embodiment, two; types of instruction codes are stored in the ROM 1. The first type instruction codes are coded in accordance with one predetermined coding format, and the second type instruction codes are coded in accordance with another predetermined coding format. The first type instruction codes are stored in odd addresses in the ROM 1, and the second type of instruction codes are stored in even addresses. The stored instruction codes, when decoded properly in accordance with this embodiment as described later, perform a single, meaningful processing. When the stored instruction codes are decoded by a single decoder in a conventional manner, however, the decoded results will be meaningless. Therefore, third persons cannot learn what processing the stored instruction codes intend to perform even if they copy the stored instruction codes.

In the decoding operation, the program counter 15 sequentially generates address signals. The address signals are supplied through the address bus 2 to the ROM 1 for accessing it. Thus, instruction codes which constitute a program stored in the ROM 1 are sequentially read out to the data bus 3 as in the conventional manner. The instruction codes on the data bus 3 are sequentially supplied to, in this embodiment, both of the gate circuit 11 and 12 in parallel. Simultaneously, the least significant bit LSB of the address signal is sequentially transferred from the discriminating circuit 22 through the selecting signal line 10 to the input of the inverter circuit 12 and to the gate electrodes of the FET's 14a in the first gate circuit 11.

When the least significant bit is "1", the FET's 14a in the first gate circuit 11 are turned on so that the instruction code read out from the ROM 1 is transferred through the first gate circuit 11 to the first instruction decoder 5 and is decoded therein. Because the least significant bit is "1", the read out instruction code was stored in an odd address in the ROM 1. Therefore, this instruction code is of the first type. The first instruction decoder 5 decodes this instrution code in accordance with a first type of decoding format. Since the gate electrodes of the FET's 14b in the second gate circuit 13 receive a "0" signal from the inverted circuit 12, the instruction code is stopped from being transferred to the second instruction decoder 6.

When the least significant bit is "0", the second type instruction code is transferred from the data bus 3 through the second gate circuit 13 to the second instruction decoder 6 and is stopped from being transferred to the first instruction decoder 5. Using the second instruction decoder 6, the instruction code of the second type is decoded in accordance with a second type of decoding format.

The control circuit 7 alternately receives the decoded signals from the first instruction decoder 5 and the second instruction decoder 6 to perform the desired processing.

A more practical example explaining the embodiment of the present invention will now be described with reference to FIGS. 2A through 5.

Figure 2A:
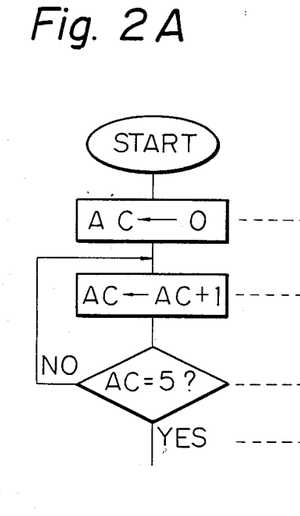
FIG. 2A is a flow chart illustrating an example of a process executed in the microcomputer unit of FIG. 1.
Figure 2B:
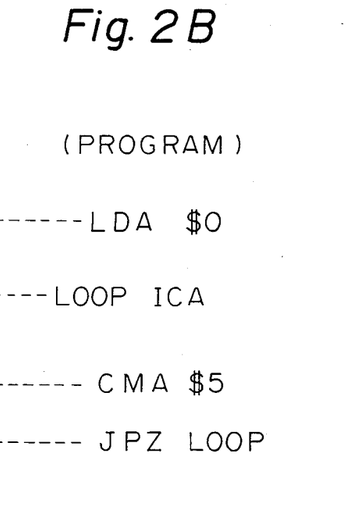
FIG. 2B is a program list corresponding to the flow chart of FIG. 2A.
Figure 3:
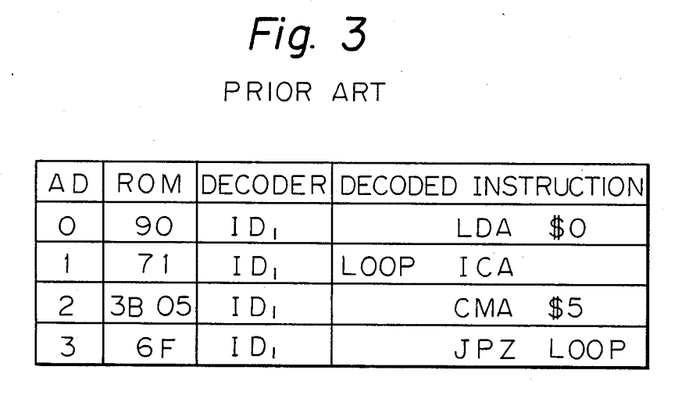
FIG. 3 is a table for explaining the conventional coding and decoding method in the execution of the process of FIG. 2A.
Figure 4:
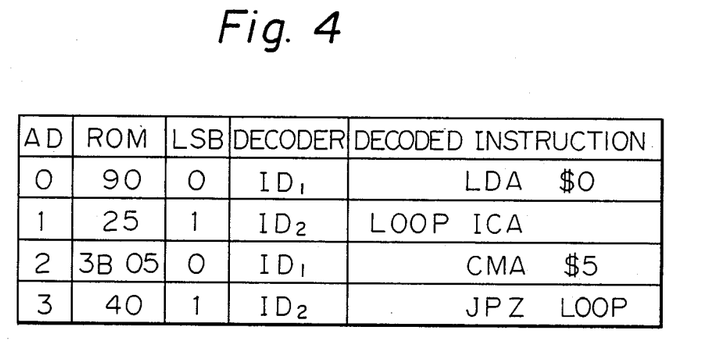
FIG. 4 is a table for explaining the enciphering and deciphering method in the execution of the process of FIG. 2A according to the embodiment of the present invention.
Figure 5:
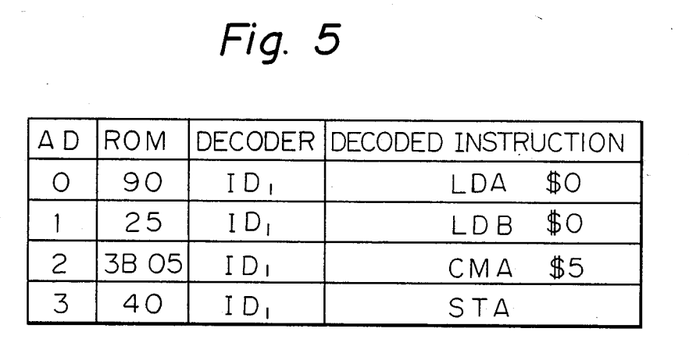
FIG. 5 is a table for explaining the reason why the contents of the ROM coded according to the embodiment of the present invention cannot be learned by third persons.

Assume that a process shown in the flow chart of FIG. 2A is to be performed. In FIG. 2A, in the first step, the accumulator 21 (FIG. 1) is cleared, that is, "0"s are stored in the accumulator 21; in the second step, the content of the accumulator 21 is increased by one; and in the third step, the content of the accumulator is compared with the value "$5". If the content is not equal to "$5", the process of the second step is repeated. Note that the expressions "$0" and "$5" in FIG. 2A and in FIGS. 3, 4, and 5 represent "0" and "5" expressed in hexadecimal respectively. FIG. 2B is a program list corresponding to the flow chart of FIG. 2A. This program is stored in the ROM 1 in machine code.

FIG. 3 is a table for explaining the conventional coding and decoding method in the execution of the process of FIG. 2A. In FIG. 3, the first type instruction codes 90, 71, 3B, 05, 6F (hexadecimal expression) are stored in the addresses 0, 1, 2, and 3 of the ROM 1. If these codes are decoded by a single instruction decoder, for example, 5 in accordance with the first type of decoding format, the decoded instructions at the output of the instruction decoder 5 represent the desired processing which coincides with the program list of FIG. 2B. When third persons read the contents in the ROM 1 through the data bus 3, they can easily learn the relation between the program list of FIG. 2A and the stored instruction codes in the ROM 1.

According to the embodiment of the present invention, as illustrated in FIG. 4, the first type two-byte codes 90, 3B, and 05 are stored only in the even addresses 0 and 2 of the ROM 1. In the odd addresses 1 and 3, the second type instruction codes 25 and 40 are stored. The first type instruction codes are decoded by the first instruction decoder 5. The second type instruction codes are decoded by the second instruction decoder 6. The results of the decoded instructions coincide with the program list of FIG. 2B.

If the two types of instruction codes of FIG. 4 are decoded by a single decoder, for example, 5, the decoded instruction will be meaningless, as illustrated in FIG. 5. That is, in the second step, instead of the desired instruction "LOOP ICA", an undesired instruction "LDB" representing the clearing of an accumulator B (not shown) is obtained and, in the fourth step, instead of the desired instruction "JPZ LOOP", an undesired instruction "STA" is obtained. The decoded instructions LDA $0, LDB$0, CMA$5, and STA as a whole are meaningless. For example, if two-byte instruction codes are employed in the exution of the instruction "LDB", the code "3B" is stored as data into the accumulator B and the value "05" is used as a next instruction code. Thus, the next instruction "CMA $5" cannot be executed. Accordingly, the stored instruction codes cannot be practically decoded by third persons unless they know the decoding formats in the first and the second instruction decoders 5, 6 and the controlling format in the determining circuit 4. That is, the stored software can be said to be enciphered.

Referring back to FIG. 1, the first instruction decoder 5 and the second instruction decoder 6 are wired so that they decode different type instruction codes to provide the same decoded instructions. For example, the first instruction decoder 5 can decode the instruction code "71" to provide the decoded instruction "LOOP ICA", while the second instruction decoder 6 can decode the different instruction code "25" to provide the same decoded instruction "LOOP ICA" as in the first instruction decoder 5. This alternate decade wiring can be easily made by those skilled in the art and, therefore, is not illustrated in the figure.

The present invention is not restricted to the above-described embodiment. Various changes and modifications are possible without departing from the spirit of the invention. For example, in another embodiment instead of storing two types of instruction codes in the ROM 1, three or more types of instruction codes for performing one and the same processing may alternatively be stored. In this case, the selecting signal line 10 should transfer two or more bits selected from the address signals, and two or more gate circuits and two or more instruction decoders connected to the gate circuit should be provided. The selected two or more bits determine what type of code the read instruction code is. It will be easily seen that when three or more types of instruction codes are stored in the ROM 1 in an alternative embodiment, the scrambling degree is greater than that in the first embodiment. It is preferable to increase the scrambling degree when the stored instruction codes are more frequently decoded.

In another embodiment, instead of providing the gate circuits 11 and 12 between the data bus 3 and the instruction decoders 5 and 6, the gate circuits 11 and 12 may alternatively be provided between the instruction decoders 5 and 6 and the control circuit 7.

Figures 6, 7:
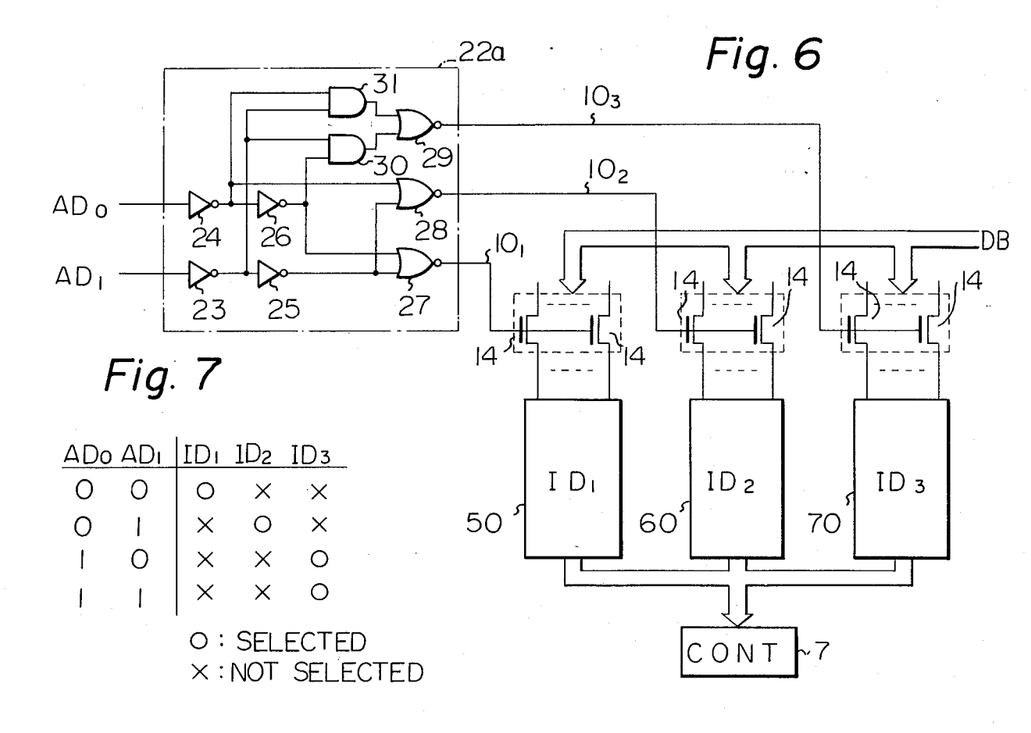
FIG. 6 is a block diagram illustrating three instruction decoders and a discriminating circuit in a microcomputer unit according to another embodiment of the present invention.
FIG. 7 is a table showing the relationship between the address signals and the selected instruction decoders of FIG. 6.

FIG. 6 is a block diagram illustrating three instruction decoders and a discriminating circuit in a microcomputer unit according to another embodiment of the present invention. Instead of the two instruction decoders 5 and 6 in FIG. 1, three instruction decoders 50, 60, and 70 are employed in this embodiment. Also, instead of the discriminating circuit 22 and the inverter circuit 12 in FIG. 1, another discriminating circuit 22a is employed in FIG. 6. The discriminating circuit 22a receives two bits of address signals $AD_0$ and $AD_1$ from the address bus 2 (FIG. 1), decodes the two bits and provides three selecting signals to the selecting signal lines $10_1$, $10_2$, and $10_3$. Except for the above, the microcomputer of this embodiment is substantially the same as that of FIG. 1. The discriminating circuit 22a includes four inverter circuits 23 through 26, three NOR gates 27, 28, and 29, and two AND gates 30 and 31.

FIG. 7 is a table showing the relationship between the address signals $AD_0$ and $AD_1$ and the selected instruction decoders. From FIGS. 6 and 7, it will be easily seen that, when the address signals are (0, 0), (0, 1), (1, 0), or (1, 1), the instruction decoder 50, 60, 70, or 70 is selected, respectively. The instruction decoders 50, 60, and 70 decode the instruction codes in different decoding formats similar to the decoders 5 and 6 of FIG. 1.

From the foregoing description, it will be apparent that, according to the present invention, since instruction codes coded in different coding formats are supplied to appropriate decoders by selecting circuit and decoded by the decoders, the software including these instructions cannot be easily learned by third persons. As a result, developers of software can keep their software from being stolen or misused.

I claim:

1. A deciphering apparatus for a microcomputer, comprising:

instruction receiving means for receiving at least two types of instruction codes, each type of instruction code being enciphered in accordance with a corresponding predetermined enciphering format, all instructions being enciphered and at least two types of instruction codes are enciphered in accordance with different enciphering formats;

address signal generating means for generating addresses of said at least two type of instruction codes;

discriminating means, operatively connected to said address-signal generating means, for discriminating the type of instruction code received by said instruction receiving means, in dependence on a value of a least significant bit in the addresses, to read said instruction code;

at least two instruction decipherers, each decipherer deciphering said instruction codes in accordance with a corresponding predetermined deciphering format, each decipherer having a different deciphering format producing different deciphered results for the same instruction codes and said at least two decipherers deciphering the corresponding type instructions in a one to one correspondence; and selecting means, operatively connected to said discriminating means and between said instruction receiving means and said at least two instruction decipherers, for selectively supplying an instruction code to only one of said at least two instruction decipherers in response to discrimination by said discriminating means.

2. A deciphering apparatus for a microcomputer, comprising:

instruction receiving means for receiving at least two types of instruction codes, each type of instruction code being enciphered in accordance with a corresponding predetermined enciphering format, all instructions being enciphered and at least two types of instructions are enciphered in accordance with different enciphering formats;

address signal generating means for generating addresses of said at least two types of instruction codes;

discriminating means, operatively connected to said address signal generating means, for dicriminating the type of instruction code received by said instruction receiving means, in dependence on a value of a least significant bit in the addresses, to read said instruction code;

at least two instruction decipheres operatively connected to said instruction receiving means, each decipherer deciphering said instruction codes in accordance with a corresponding predetermined deciphering format, each decipherer having a different deciphering format producing different deciphering results for the same instruction codes and said at least two decipherers deciphering the corresponding type instructions in a one to one correspondence; and selecting means, operatively connected to said discriminating means and said at least two instruction decipherers, for selectively outputting the deciphered results from one of said at least two instruction decipherers in dependence upon the discrimination by said discrimination means.

3. A deciphering apparatus for a microcomputer capable of executing a plurality of types of instructions, the microcomputer including:
   a read only memory for storing a program having instructions of an instruction set, the program being constructed from a combination of first type instruction codes enciphered by a first enciphering format and second type instruction codes enciphered by a second enciphering format;
   a data bus connected to said read only memory;
   an address bus connected to said read only memory;
   a program counter, connected to said address bus, for generating an address to access said read only memory; and
   a control unit for generating control signals to control the microcomputer and external circuits; and
   said apparatus comprising:
   a first instruction decipherer, connected to said control unit, for supplying a deciphered instruction code, and capable of deciphering all of the first type instruction codes corresponding to said plurality of types of instructions, in a one to one correspondence;
   a second instruction decipherer, connected to said control unit, for supplying the deciphered instruction codes, and capable of deciphering all of the first type instruction codes corresponding to said plurality of types of instructions, in a one to one correspondence;
   a selecting circuit, connected between said data bus and said first and second instruction decipherers, for selectively supplying the output of said read only memory to one of said first and second instruction decipherers; and
   a discriminating circuit, connected between said address bus and said selecting circuit, for controlling said selecting circuit in response to a least significant bit of the address to supply the first or the second type instruction code read from said read only memory to a corresponding one of said first and second instruction decipherers and
   whereby the program constructed from the combination of said first type instruction codes and said second type instruction codes is executed.

4. A deciphering apparatus for microcomputer capable of executing a plurality of types of instructions, said microcomputer including:
   a read only memory for storing a program having instructions of an instruction set, the program being constructed from a combination of first type instruction codes enciphered by a first enciphering format and second type instruction codes enciphered by a second enciphering format;
   a data bus connected to said read only memory;
   an address bus connected to said read only memory;
   a program counter, connected to said address bus, for generating an address to access said read only memory; and
   a control unit for generating control signals to control the microcomputer itself and external circuits; and said apparatus comprising:
   a first instruction decipherer, connected to said control unit, for supplying a deciphered instruction code, capable of deciphering all of the first type instruction codes corresponding to said plurality of types of instructions in a one to one correspondence;
   a second instruction decipherer, connected to said control unit, for supplying the deciphered instructions, capable of deciphering all of the second type instruction codes corresponding to said plurality of types of instructions in a one to one correspondence;
   a selecting circuit, connected between outputs of said first and second instruction decipherers and said control unit, for selectively outputting the deciphered results from one of said first and second instruction decipherers; and
   a discriminating circuit, connected between said address bus and said selecting circuit, for controlling said selecting circuit in response to a least significant bit of the address to supply the first or the second type instruction code read from said read only memory to a corresponding one of said first and second instruction decipherers; and
   whereby the program constructed from the combination of said first type instruction codes and said second type instruction codes is executed.

5. A deciphering apparatus for a microcomputer, comprising:
   instruction receiving means for receiving at least two types of instruction codes, each type of instruction code being enciphered in accordance with a corresponding predetermined enciphering format, all instructions being enciphered and at least two types of instruction codes are enciphered in accordance with different enciphering formats;
   address signal generating means for generating addresses of said at least two type of instruction codes;
   discriminating means, operatively connected to said address-signal generating means, for discriminating the type of instruction code received by said instruction receiving means, in dependence on a value of a predetermined bit in the addresses, selected from among a least significant bit through a most significant bit, to read said instruction code;
   at least two instruction decipherers, each decipherer deciphering said instruction codes in accordance with a corresponding predetermined deciphering format, each decipherer having a different deciphering format producing different deciphered results for the same instruction codes and said at least two decipherers deciphering the corresponding type instructions in a one to one correspondence; and
   selecting means, operatively connected to said discriminating means and between said instruction receiving means and said at least two instruction decipherers, for selectively supplying an instruction code to only one of said at least two instruction decipherers in response to discrimination by said discriminating means.

6. An apparatus as set forth in claim 5, wherein said discriminating means comprises means for generating a selecting signal from the predetermined bit of each one of the addresses, and said selecting means comprises gate means, operatively connected to said means for generating the selecting signal and said at least two instruction decipherers, for transferring an instruction code to one of said at least two instruction decipherers, said selecting signal being supplied to said gate means to open or close said gate means.

7. An apparatus as recited in claim 5, wherein the microcomputer includes an instruction set and each decipherer, when provided with the enciphered instruction set, produces each one of the instructions of the instruction set.

8. An apparatus as set forth in claim 5, wherein the deciphered results from said at least two instruction decipherers coincide with instructions to be performed by said microcomputer.

9. An apparatus as set forth in claim 6, wherein said means for generating the selecting signal comprises a signal line, operatively connected between said address signal generating means and siad gate means, transferring the least significant bit of each address.

10. An apparatus as set forth in claim 6, wherein said means for generating the selecting signal comprises a decoding circuit, operatively connected between said address signal generating means and said gate means, for decoding the least significant bit of each address signal and providing selection signals controlling said gate means.

11. A deciphering apparatus for a microcomputer, comprising:
   instruction receiving means for receiving at least two types of instruction codes, each type of instruction code being enciphered in accordance with a corresponding predetermined enciphering format, all instructions being enciphered and at least two types of instructions are encoded in accordance with different enciphering formats;
   address signal generating means for generating addresses of said at least two types of instruction codes;
   discriminating means, operatively connected to said address signal generating means, for discriminating the type of instruction code received by said instruction receiving means, in dependence on a value of a predetermined bit in the addresses, selected from among a least significant bit through a most significant bit, to read said instruction code;
   at least two instruction decipherers operatively connected to said instruction receiving means, each decipherer deciphering said instruction codes in accordance with a corresponding predetermined deciphering format, each decipherer having a different deciphering format producing different deciphering results for the same instruction codes and said at least two decipherers deciphering the corresponding type instructions in a one to one correspondence; and
   selecting means, operatively connected to said discriminating means and said at least two instruction decipherers, for selectively outputting the deciphered results from one of said at least two instruction decipherers in dependence upon the discrimination by said discrimination means.

12. An apparatus as recited in claim 11, wherein said at least two instruction decipherers include first and second decipherers, said addresses include odd and even addresses respectively, and said first decipherer deciphers odd address location instructions and said second decipherer deciphers even address location instructions in accordance with the least significant bit in the addresses.

13. An apparatus as recited in claim 11, wherein the microcomputer includes an instruction set and each decipherer, when provided with the enciphered instruction set, produces each one of the instructions of the instruction set.

14. A deciphering apparatus for a microcomputer capable of executing a plurality of types of instructions, the microcomputer including:
   a read only memory for storing a program having instructions of an instruction set, the program being constructed from a combination of first type instruction codes enciphered by a first enciphering format and second type instruction codes enciphered by a second enciphering format;
   a data bus connected to said read only memory;
   an address bus connected to said read only memory;
   a program counter, connected to said address bus, for generating an address to access said read only memory; and
   a control unit for generating control signals to control the microcomputer and external circuits; and
   said apparatus comprising:
   a first instruction decipherer, connected to said control unit, for supplying a deciphered instruction code, and capable of deciphering all of the first type instruction codes corresponding to said plurality of types of instructions, in a one to one correspondence;
   a second instruction decipherer, connected to said control unit, for supplying the deciphered instruction codes, and capable of deciphering all of the second type instruction codes correponding to said plurality of types of instructions in a one to one correspondence;
   a selecting circuit, connected between said data bus and said first and second instruction decipherers, for selectively supplying the output of said read only memory to one of said first and second instruction decipherers; and
   a discriminating circuit, connected between said address bus and said selecting circuit, for controlling said selecting circuit in response to a predetermined bit of the address, selected from among a least significant bit through a most significant bit, to supply the first or the second type instruction code read from said read only memory to a corresponding one of said first and second instruction decipherers; and
   whereby the program contructed from the combination of said first type instruction codes and said second type instruction codes is executed.

15. A microcomputer as set forth in claim 14, wherein said discriminating circuit comprises means for generating a selecting signal from the predetermined bit of the address, and said selecting circuit comprises gate means, operatively connected to said means for generating the selecting signal and said first and second instruction decipherers, for transferring an instruction code to one of said first and second instruction decipherers, said selecting signal being supplied to said gate means to open or close said gate means.

16. A microcomputer as set forth in claim 14, wherein the deciphered results from said first and second instruction decipherers coincide with instructions of the instruction set to be performed by said microcomputer.

17. A microcomputer as set forth in claim 15, wherein said means for generating the selecting signal comprises a signal line, operatively connected between said program counter and said gate means, transferring the least significant bit of the address.

18. A microcomputer as set forth in claim 15, wherein said means for generating the selecting signal comprises a decoding circuit, operatively connected between said program counter and said gate means, for decoding the least significant bit of the address signal and providing a selection signal controlling said gate means.

19. An apparatus as recited in claim 14, wherein the microcomputer includes an instruction set and each decipherer, when provided with the enciphered instruction set, produces each one of the instructions of the instruction set.

20. A deciphering apparatus for a microcomputer capable of executing a plurality of types of instructions, said microcomputer including:
- a read only memory for storing a program having instructions of an instruction set, the program being constructed from a combination of first type instruction codes enciphered by a first enciphering format and second type instruction codes enciphered by a second enciphering format;
- a data bus connected to said read only memory;
- an address bus connected to said read only memory;
- a program counter, connected to said address bus, for generating an address to access said read only memory; and
- a control unit for generating control signals to control the microcomputer itself and external circuits; and said apparatus comprising:
- a first instruction decipherer, connected to said control unit, for supplying a deciphered instruction code, capable of deciphering all of the first type instruction codes corresponding to said plurality of types of instructions in a one to one correspondence;
- a second instruction decipherer, connected to said control unit, for supplying the deciphered instructions, capable of deciphering all of the second type instruction codes corresponding to said plurality of types of instructions in a one to one correspondence;
- a selecting circuit, connected between outputs of said first and second instruction decipherers and said control unit, for selectively outputting the deciphered results from one of said first and second instruction decipherers; and
- a discriminating circuit, connected between said address bus and said selecting circuit, for controlling said selecting circuit in response to a predetermined bit of the address, selected from among a least significant bit through a most significant bit, to supply the first or the second type instruction code read from said read only memory to a corresponding one of said first and second instruction decipherers; and
- whereby the program constructed from the combination of said first type instruction codes and said second type instruction codes is executed.

21. An apparatus as recited in claim 20, wherein the microcomputer includes an instruction set and each decipherer, when provided with the enciphered instruction set, produces each one of the instructions of the instruction set.

* * * * *

UNITED STATES PATENT AND TRADEMARK OFFICE
CERTIFICATE OF CORRECTION

PATENT NO. : 4,905,277
DATED : February 27, 1990
INVENTOR(S) : Haruhiko Nakamura It is certified that error appears in the above-identified patent and that said Letters Patent is hereby corrected as shown below:

Col. 1, line 20, "rfor" s/b --for--, "opreation" s/b --operation--.

Col. 3, line 17, delete ";".

Col. 4, line 57, "CMA$5" s/b --CMA$_5--;
line 62, "$5" s/b --$_5--.

Col. 5, line 10, "decade" s/b --decode--.

Col. 6, line 51, "dicriminating" s/b --discriminating--.

Col. 7, line 30, "first" s/b --second--.

Col. 9, line 13, "siad" s/b --said--.

Signed and Sealed this

Twenty-seventh Day of August, 1991

*Attest:*

HARRY F. MANBECK, JR.

*Attesting Officer*     *Commissioner of Patents and Trademarks*